US009554447B2

(12) United States Patent
Rains, Jr. et al.

(10) Patent No.: US 9,554,447 B2
(45) Date of Patent: Jan. 24, 2017

(54) HEAD-WEARABLE USER INTERFACE DEVICE FOR LIGHTING RELATED OPERATIONS

(71) Applicant: ABL IP HOLDING LLC, Conyers, GA (US)

(72) Inventors: Jack C. Rains, Jr., Herndon, VA (US); David P. Ramer, Reston, VA (US); Januk Aggarwal, Tysons Corner, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 357 days.

(21) Appl. No.: 14/077,941

(22) Filed: Nov. 12, 2013

(65) Prior Publication Data

US 2015/0130355 A1     May 14, 2015

(51) Int. Cl.
*H05B 37/02*    (2006.01)
*G06F 3/01*     (2006.01)
*G01S 5/16*     (2006.01)
*G01S 3/784*    (2006.01)
*G02B 27/01*    (2006.01)

(52) U.S. Cl.
CPC .......... *H05B 37/0227* (2013.01); *G01S 3/784* (2013.01); *G01S 5/16* (2013.01); *G02B 27/017* (2013.01); *G06F 3/011* (2013.01); *H05B 37/0218* (2013.01); *H05B 37/0272* (2013.01); *G02B 2027/014* (2013.01); *G02B 2027/0138* (2013.01); *G02B 2027/0178* (2013.01); *Y02B 20/46* (2013.01)

(58) Field of Classification Search
CPC ............ H05B 37/0227; H05B 37/0218; H05B 37/0272; G02B 27/0176; G02B 27/0101
See application file for complete search history.

(56) References Cited

U.S. PATENT DOCUMENTS 5,705,804 A    1/1998  Ramer et al.
6,043,873 A    3/2000  Ramer et al.
(Continued)

OTHER PUBLICATIONS

U.S. Appl. No. 13/903,428, filed May 28, 2013 entitled "Distributed Processing Using Resources of Intelligent Lighting Elements of a Lighting System".
(Continued)

*Primary Examiner* — Shaheda Abdin
(74) *Attorney, Agent, or Firm* — RatnerPrestia (57) ABSTRACT

A wearable user interface device provides a display (e.g. an augmented reality display) for a user/wearer. The device includes a camera or other optical sensor and wireless communication capability. The camera or sensor provides an input to detect and possibly communicate with a lighting device or system. The communications and display capabilities allow the device to obtain and present lighting-related information to the wearer. For example, before installation, the device may identify a light fixture and communicate with a server to obtain information about fixture installation or configuration. As another example, the user can operate the device to identify and communicate with an installed fixture, to configure the fixture into a system (e.g. as part of a lighting group) or to check or repair fixture or system firmware. Hence, the device provides a wearable, interactive user interface for a variety of lighting-related functions.

20 Claims, 3 Drawing Sheets

(56) References Cited

U.S. PATENT DOCUMENTS

| | | | |
|---|---|---|---|
| 8,890,773 B1* | 11/2014 | Pederson | H04B 1/385 345/8 |
| 2012/0075168 A1* | 3/2012 | Osterhout | G02B 27/017 345/8 |
| 2012/0242698 A1* | 9/2012 | Haddick | G02B 27/0093 345/633 |
| 2013/0235331 A1 | 9/2013 | Heinrich et al. | |
| 2013/0241907 A1 | 9/2013 | Amirparviz et al. | |
| 2013/0258270 A1 | 10/2013 | Cazalet et al. | |

OTHER PUBLICATIONS

U.S. Appl. No. 13/964,564, filed Aug. 12, 2013 entitled "Lighting Element—Centric Network of Networks".

U.S. Appl. No. 13/971,428, filed Aug. 20, 2013 entitled "Interactive User Interface Functionality for Lighting Devices or System".

Anthony Domanico; Laptop; "Top 5 Google Glass alternatives"; Technology; Aug. 28, 2013; pp. 1-4; http://www.nbcnews.com/technology/top-5-google-glass-alternatives-8C11014693.

"Google Glass"; Wikipedia, the free encyclopedia; Nov. 6, 2013; pp. 1-6; http://en.wikipedia.org/wiki/Google_Glass.

"Brain-computer interface"; Wikipedia, the free encyclopedia; Nov. 11, 2013; pp. 1-20; http://en.wikipedia.org/wiki/Brain%E2%80%93computer_interface.

* cited by examiner

HEAD-WEARABLE USER INTERFACE DEVICE FOR LIGHTING RELATED OPERATIONS

TECHNICAL FIELD

The present subject matter relates to techniques and equipment to provide a user interface, for lighting related activities, via a device that is wearable on the user's head.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use.

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

There are a variety of situations in which it is desirable to allow a user an appropriate form of interface for various functions related to lighting. For installation, and service or maintenance for example, a technician may need data about specific devices, their installation and configuration in preparation for and/or while doing work relative to the lighting device. Traditionally, such technical information took paper form, such as specification sheets packaged with the lighting devices and construction plans as to where each device should be installed. More recently, technicians have accessed the appropriate information via portable computer terminal devices or via mobile devices such as smartphones and tablet computers. Where the lighting device or system supports data network communications, such user devices may also communicate with lighting devices or other elements of a system to obtain data as to device or system health, diagnose issues and take corrective steps (e.g. change configuration settings and/or change or re-install firmware).

In a somewhat related field a variety of entities are proposing controls for lighting and other functions in a building from a variety of portable user devices, for example, from remote controls or from mobile devices such as smartphones or tablet computers.

Despite such recent efforts, there is still room for further improvement in the user interface with a lighting system and/or in the functions that a lighting system may offer through its user interface.

SUMMARY

The technology examples disclosed herein provide devices, programming and methodologies for improved lighting related wearable user interface devices, e.g. configured to be worn on the head. In several aspects, the examples discussed in the detailed description utilize or relate to headgear or other structural arrangements of a device to be wearable on the user's head, in which the head-wearable device is specifically configured for lighting related operations, such as user interface functions. As used herein, use of the term "head-wearable" to describe a device is meant to broadly encompass any item of headgear, eyewear, clothing or apparel or other accessory or the like that can be worn on a user's head. Examples of head-wearable items include monocles, spectacles, eyeglasses, contact lenses and goggles; hats, helmets and visors; ornamental apparel (e.g. headpieces, earrings, etc.); as well as earphones, earmuffs and headphones or headsets; or the like.

In the examples, a head-wearable user interface device includes a framework configured to enable a user to wear the user interface device. A display, supported by the framework, is viewable by at least one eye of the user when wearing the user interface device. The device also includes a processor, a camera and a memory, supported by the framework. The device also includes a wireless communication transceiver, although the transceiver may be supported by the framework or mounted or worn elsewhere by the user and coupled to the processor. In some examples, the device also includes a user input. The memory includes programming for the processor, which configures the processor to control functions or operations of the user interface device.

By way of an example, lighting related functions of the head-wearable user interface device may involve processing an image obtained via a camera to capture a parameter of a lighting device, e.g. in response to a selection via the user input. Based on the captured parameter, the device wirelessly communicates to obtain lighting installation or operation-related information with respect to the lighting device via a communication network. The device then presents the obtained information to the user while wearing user interface device, via the display.

By way of another example, the programming for the head-wearable user interface device may include an operating system and a lighting application. The operating system controls general operating functions of the head-wearable user interface device. The lighting application is configured for execution via the operating system, to enable the head-wearable user interface device to provide one or more user interface functions for the user wearing the device, with respect to a lighting device or system observable to the user while wearing the user interface device.

Examples of technologies discussed in the detailed description below also include examples of techniques for performing a variety of lighting related operations via headgear and/or other types of wearable user interface device.

Other technology examples relate to program products (e.g. articles including a medium and programming) to configure a wearable user interface device to perform functions and/or methods as described herein.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Many of the various examples discussed below relate to use of head-wearable user interface devices. In the illustrated examples, the interface device takes the form of headgear, such as eyeglasses or a hat or helmet, that provides a display (e.g. an augmented reality display) for a user/wearer, specifically adapted for use with a lighting or system. Although the head-wearable user interface device may use other form factors as noted earlier, since FIG. 1 shows the device by way of example as eyewear or the like, we will in many instances refer to examples below using the term headgear. The use of a head-wearable configuration for the user interface device for lighting-related operations allows the wearer to use the device to obtain information in a manner that keeps the both of the wearer's hands free to do other things, particularly while viewing information and using that information for other lighting related purposes. For example while installing a light, once the wearer has operated the device to request information, the information is available on the display without further manual operations even to hold the device; and the installer's hands are free for the activities involved in installing the light. It should be noted, however, that some operational examples discussed later may be applicable to other user interface devices configured to be worn on other parts of the body.

The head-wearable user interface device includes a framework configured to enable a user to wear the headgear. For glasses or helmets, the framework may be rigid; however, the framework may be flexible, e.g. if the headgear were a headband or soft cap or the like. In a contact lens example, the lens material itself becomes the framework. In an eyewear example, the framework could take the form of an eyeglass frame. The device includes a number of elements attached to or housed in some manner within the framework. The device would also include a display or other type of output device, supported by the framework. A display, for example, would be viewable by at least one eye of the user when wearing the user interface device. The device also includes a camera and/or other sensor supported by the framework. A wireless transceiver supports communications for the user interface device.

In an example of a head-wearable user interface device where the device is intelligent, a processor controls device operations, and the interface device also includes memory and programming in the memory for execution by the processor. As discussed in more detail below, the programming configures the intelligent type head-wearable user interface device for specific functions relating to a lighting device or system observable by the user while wearing the device, including for example, providing a user interface for lighting related operations of the device.

Figure 1:
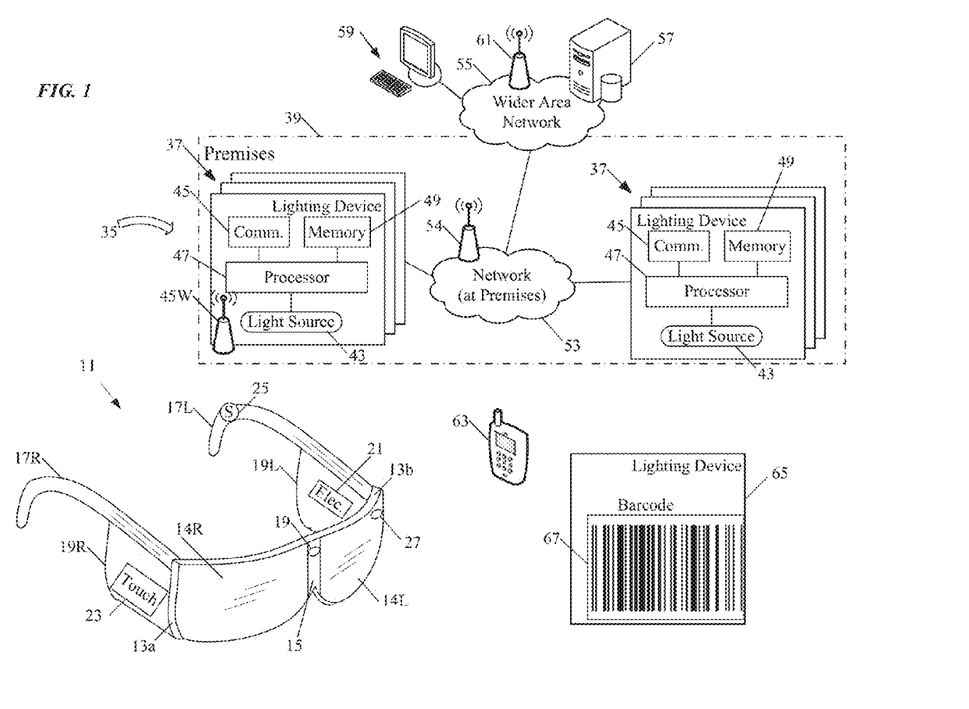
FIG. 1 depicts a stylized representation of an example of a head-wearable user interface device in the form of goggles or eyeglasses; and the drawing shows a number of elements in block diagram form with which the user interface device may operate or interact when providing a user interface for lighting related purposes.

Reference now is made in detail to the examples illustrated in the accompanying drawings and discussed below. FIG. 1 illustrates an example 11 of the head-wearable user interface device, in this example, headgear configures as a user interface device and in the form of eyeglasses or goggles. As used herein, the term "headgear" is meant to broadly encompass many types of head-wearable configurations, including for example, any item of eyewear, clothing or apparel or other accessory or the like that can be worn on a user's head, although as noted above, a "head-wearable" device may take some additional forms that may be worn on a user's head. Examples of headgear include eyewear, such as monocles, spectacles, eyeglasses, contact lenses and goggles; as well as hats, helmets, visors and the like. Where the description refers more broadly to wearable user interface device (without specific reference to headgear or head-wearable), the description encompasses other form factors that may be worn elsewhere on the body of the user, such as smart watches or smart brooches or smartphones or the like.

The headgear 11 in the example includes a framework configured to enable a user to wear the headgear. Where the headgear 11 is a pair of eyeglasses, such as in the example of FIG. 1, the frame of the glasses forms the framework. Hence, in the example, the framework includes elements such as 13a, 13b forming lens frames for two lenses 14L and 14R, a centerpiece 15 and wings or side-arms of the eyeglass frame shown at 17L, 17R. The example also includes side panels 19L, 19R attached to the respective wings 17L, 17R. The form and framework of the eyeglasses are shown and discussed by way of example only. Other eyewear styles and arrangements of frame elements may be used. For example, although shown as two lenses, some styles may use a single transparent panel. Other eyewear examples may not include actual lenses, depending on the display technology and/or on other intended uses of the eyewear.

The head-wearable user interface device, however, also may take other forms and therefore may incorporate still other types of framework. Another headgear type of the form factor, for example, is a helmet, e.g. for a worker at a construction site. As noted, in the eyewear example, with two lenses, the frame of the eyeglasses includes two lens frames as well as two wings attached to opposite sides of the lens frames; however, in a helmet example, the shell of the helmet serves as or forms at least part of the framework for the headgear type wearable user interface device 11.

The head-wearable user interface device, in the example, includes one or more sensors or inputs usable to detect, identify and/or communicate with a lighting device or system of lighting devices. Returning to the illustrated eyewear, by way of an example, the headgear 11 includes a camera 19. In the example, the camera 19 is mounted on the centerpiece 15 between the lenses 14L and 14R. Other positions and mounting arrangements may be used for the camera 19. The camera 19 in the example is of a type the same as or similar to cameras used in smartphones and other portable/mobile devices, and the camera 19 is capable of capturing still images and video. Such an example utilizes a camera that is sensitive to at least a substantial range of the visible spectrum. However, other types of imaging technologies that may be used to form the camera may instead or in addition be sensitive to energy in other regions of the spectrum, e.g. infrared, ultraviolet or radio frequency. For lighting purposes, the camera can be used to sense marks or the like on a lighting device (device itself or device packaging), to image the lighting device, to observe lighting performance and/or to detect information carried on light emitted from lighting devices or other lighting system components. Of course, the camera 19 is also available as an image input for a wide range of other purposes that may be desirable to a user, including lighting and non-lighting uses of the device 11.

Also, although the examples show one camera 19 in the head-wearable user interface device 11, such a device may include one or more additional cameras. The camera 19 is shown directed along the wearer's field of view, and an additional may have a generally parallel field of view (e.g. as if one camera is associated with each of the wearer's two eyes). The camera 19 or an additional camera, however, may have a different orientation, with a field of view in another direction, e.g. straight up, or up or down at an angle with respect to eye field of view. An alternate field of view, for example, may allow detection of a lighting device by the camera(s) without requiring the user/wearer to look directly at a bright source of light from a lighting device. In some arrangements, the camera angle may be adjustable.

The head-wearable user interface device 11 includes a display supported by the framework so as to be viewable by at least one eye of the user when wearing the headgear. As discussed more later, output to a user wearing an interface device may take other forms, e.g. audio output, either instead of or in addition to display output. A variety of display technologies may be used to present information to the eye of the user, on or through the lens or in other ways if the lenses are omitted. In the example, however, one or both of the lenses 14L and 14R serve as the display (as well as allowing light to pass through to the eye(s) of the wearer of the headgear). For such an implementation, each lens element 14L or 14R intended to serve as a display may be formed of or coated with material(s) to display data (e.g. text and/or still or video images) while still retaining sufficient transparency to allow the wearer to see and observe objects through the respective lens. However, the display need not be transparent, the device could be configured such that the display presents the camera image in real time (to appear as if seen through a lens) with a presentation of data as an overlay on the real-time image. In the example, the display covers primary lines of sight or field of view of at least one of the user's eyes. Other configurations, however, may provide the information display at a somewhat more peripheral position, e.g. located slightly outside the user's primary line(s) of sight/field(s) of view.

Other technologies may be used to provide the heads-up display, some of which do not require a lens or the like one which to generate or project the displayed information content. Displaying information while still allowing the user to see through the location of the information display, e.g. through the lens or lenses 14L, 14R in the illustrated example, configures the headgear 11 to provide a heads-up display feature for example in the form of an augmented reality display in which information is superimposed over the user's view of objects through the lenses 14L and 14R. Other technologies may be used to provide the heads-up display, some of which do not require a lens or the like one which to generate or project the displayed information content.

Processing of information may be done in the head-wearable user interface device 11 and/or in other data processors that communicate with the device 11. The device 11, for example, could be relatively 'dumb' with little or no processor capability within the device itself; in which case, the processing is done in the cloud, so to speak. In such a case, the device 11 may include only sufficient circuitry to process received information so as to output the information to the wearer, e.g. to display received data like on a monitor. Alternatively, the head-wearable user interface device 11 may be a relatively intelligent device with significant internal processing capability.

As discussed more later with respect to the block diagram of the headgear 11 in FIG. 2, the headgear example of the interface device also includes a wireless communication transceiver, a processor, a memory and programming in the memory. The processor and memory are supported by the framework of the head-wearable user interface device 11. In the example, the processor and memory would be part of the electronics 21. Although the electronics may be mounted in various other ways and/or at other positions on the headgear 11, in the example, the electronics 21 are located on the left side panel 19L. In the example, the wireless transceiver is included on or in the framework of the headgear 11, e.g. as a further element of the electronics 21 on the panel 19L. Depending on size constraints of the form factor and/or power requirements, however, the transceiver could be carried or worn elsewhere on the body of the user and connected to the processor in the head-wearable user interface device 11.

The head-wearable user interface device 11 may include a user input device or mechanism supported by the framework, e.g. in the form of a hardware sensor and/or logic to sense a condition via the hardware sensor or via the sensor that detects the lighting equipment (e.g. via the camera). The user input in the example is a touchpad 23 or other type of touch sensor shown at in FIG. 1. A touchpad 23, for example, may be a capacitive or other type of touch sensor similar to but typically smaller in size than touchpads commonly used today on user terminal type computer devices. Although the touchpad 23 may be mounted in various other ways and/or at other positions on the headgear 11, in the example, the touchpad 23 is located on the right side panel 19R. In that location, the touchpad 23 has a touch surface exposed for touching by one or more fingers of the wearer's right hand. For left hand operation, a similar touchpad could be provided on the left side panel 19L, instead of or in addition to the touch pad on the right side panel 19R. The user input could also be gestural through camera(s) (e.g. to detect hand movements, eye movements), through buttons on the framework, voice activated through a microphone or bone vibration sensor, through rapid positional movements of the wearer's head using an accelerometer and/or gyro (e.g. flick head up rapidly), brain computer interfaces, etc. Another approach might use voice input and speech recognition to detect user inputs.

The processor is coupled to the display, the camera, the transceiver and the input, the processor being configured to control operations of the headgear and has access to the programming in the memory. In addition to normal operations of the head-wearable user interface device 11, the programming for the processor configures the headgear 11 in our example to perform lighting related operations. The lighting related functions, for example, may include, process an image obtained via the camera to capture a parameter of a lighting device, in response to a selection via the user input. Then, based on the captured parameter, the headgear 11 may wirelessly communicate to obtain lighting installation or operation-related information with respect to the lighting device via a communication network and present the obtained information to the user while wearing headgear, via the heads-up display on one or both lenses 14L, 14R.

Parameters of a lighting device encompass a wide range of information of or about the lighting device that may be captured, for further processing, using the wearable user interface. Examples include identification information in the form of barcodes, text or other markings on the lighting device itself or its packaging; information (e.g. identification, status, power consumption, performance metrics measured by the lighting device, etc.) about the lighting device that may be captured by communication with the lighting device; as well as measurable metrics regarding light output form the lighting device (e.g. intensity, color characteristic(s), variations thereof over time, etc.). Other examples of the parameter(s) may become apparent from the detailed description of user interface operations below.

Installation-related information may be any type of information useful in installing, setting-up or configuring a newly installed a lighting device and/or useful in confirming that a completed installation is correct. Operation-related information may be any type of information that is useful in testing, maintenance, trouble-shooting, servicing, repairing, configuring, or generally operating the lighting device. Other examples of each of these types of information may become apparent from the detailed description of user interface operations below.

The selection via the user input, for example, may be a user touch on the touchpad 23 to trigger the camera 19 to capture an image or video. As another example, the user wearing the headgear 11 may activate the touchpad 23 several times to select among available applications for the processor to run, so as to pick the lighting related application. In response to this latter type of selection, the headgear 11 wakes the lighting application and provides an initial display with respect to the lighting application on one or both lenses 14L, 14R. Either in response to application launch or in response to a later selection by the user, the lighting application causes the camera 19 to operate and capture a desired image or video.

Examples of consumer devices that may serve as the wearable head-wearable user interface device 11, having combinations of various capabilities like those outlined above, which are now or likely will soon be available on the market, include Google Glass, Recon Jet, Vuzix M100, GlassUp, Meta SpaceGlasses and Telepathy.

In addition to the elements discussed above, the head-wearable user interface device may include one or more other sensors. Two such additional sensors 25 and 27 are shown by way of example in the drawing.

Although the sensor 25 may be mounted in various other ways and/or at other positions on the headgear 11, in the example, the sensor 25 is located on the wing 17L. The sensor 25 represents one or more devices that may be included in the headgear to sense orientation and/or movement of the headgear while worn by the user. By way of an example, the sensor 25 may be or include micro-scale components such as an accelerometer, a gyroscope and/or a field strength and direction sensing magnetometer, for example, implemented using Micro-Electromechanical Systems (MEMS) similar to devices used in smartphones or the like to detect direction (e.g. compass heading), elevation angle, motion and/or acceleration. Such sensing may be used to enhance processing of image data from the camera 19, e.g. to coordinate image processing with an estimate of the angle of the wearer's field of view, and/or as a form of user input, e.g. to detect head movement (such as a particular flick of the head as a selection input gesture).

Although the sensor 27 may be mounted in various other ways and/or at other positions on the headgear 11, in the example, the sensor 27 is located on the edge of the left lens 14L. If provided, the additional light sensor 27 may be a quadrant hemispherical detector (QHD), a light intensity sensor, and/or a color characteristic sensor, etc. A QHD, for example, provides light intensity sensing with respect to four quadrants and supports signal processing to determine the direction of light input. When used in the head-wearable user interface device 11, directional light sensing allows the device to detect a relative direction of the light fixture or luminaire with respect to the orientation of the headgear and thus relative to the orientation of the user's gaze. Several of these types of additional light sensors 27 also support detection of modulation of the light input. Detection of light modulation, for example, may enable the head-wearable user interface device to detect identification signals.

FIG. 1 also provides a block diagram of a number of elements of a system 35 of intelligent lighting devices 37 at one or more premises 39. Such a system 35 may also include separate standalone sensor units and will often include some number of network connected user interface elements, e.g. configured as wall controllers or the like. For convenience, such sensors and user interface components of the system 35 have been omitted.

The illustrated example of the system 35 includes a number of intelligent lighting devices 37, such as fixtures or lamps or other types of luminaires. The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device 37 may provide light for use by automated equipment, such as sensors/monitors, robots, etc. that may occupy or observe the illuminated space, instead of or in addition to light provided for an organism. As another example, a lighting device may emit light in a manner intended to simultaneously provide useful illumination of a space and transmission of data.

A lighting device 37, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) 37 illuminate a service area to a level useful for a human in or passing through the space, e.g. regular illumination of a room or corridor in a building or of an outdoor space such as a street, sidewalk, parking lot or performance venue. However, it is also possible that one or more lighting devices 37 in or on a particular premises 39 served by a system 35 have other lighting purposes, such as signage for an entrance or to indicate an exit. Of course, the lighting devices 37 may be configured for still other purposes, e.g. to benefit human or non-human organisms or to repel or even impair certain organisms or individuals.

Lighting devices may be relatively "dumb" in that they simply provide light output when on. Other system elements may provide control or even some level of communications and/or intelligence. For purposes of discussion of an example, the drawing shows a system 35 having a relatively high degree of intelligence implemented in the lighting devices themselves as well as networked communications amongst the lighting devices. Hence, in the example, each respective intelligent lighting device 37 includes a light source 43, as well as a communication interface 45 and a processor 47 coupled to control the light source 43. The light sources may be virtually any type of light source suitable to providing the intended type of light output that may be electronically controlled. The source 43, for example, may provide visible or non-visible illumination or lighting or irradiation for other purposes (e.g. lighting for robot operation, UV cleansing, etc.); although for convenience, we may at later points in this discussion refer to the principal light output as providing visible illumination for human occupancy or the like. The light sources 43 may be of the same general type in all of the lighting devices 37, e.g. all formed by some number of light emitting diodes (LEDs); although in many installations, some numbers of the lighting devices 37 may have different types of light sources 43, e.g. some use LEDs, some use compact or tube type fluorescent sources, etc.

The processor 47 also is coupled to communicate via the interface 45 and the network link with one or more others of the intelligent lighting devices 37 and is configured to control operations of at least the respective lighting device 37. The processor 47 may be implemented via hardwired logic circuitry, but in the examples, the processor 47 is a programmable processor such as the central processing unit (CPU) of a microcontroller or a microprocessor. Hence, in the example of FIG. 1, each lighting device 37 also includes a memory 49, storing programming for execution by the processor 47 and data that is available to be processed or has been processed by the processor 47. The processors and memories in the lighting devices may be substantially the same in various lighting devices 37 throughout the premises, or different devices 37 may have different processors 47 and/or different amounts of memory 49, depending on differences in intended or expected processing needs.

In the examples, the intelligence (e.g. processor 47 and memory 49) and the communications interface(s) 45 are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities. For example, the communication component(s) and possibly the processor and memory (the 'brain') may be elements of a separate device or component coupled and/or collocated with the light source 43.

In our example, the system 35 is installed at a premises 39. The system 35 also includes a data communication network 53 that interconnects the links to/from the communication interfaces 45 of the lighting devices 37, so as to provide data communications amongst the intelligent lighting devices 37. The data communication network 53 may support data communication by equipment at the premises 39 via wired (e.g. cable or fiber) media or via wireless (e.g. WiFi, Bluetooth, Zigbee, LiFi, IrDA, etc.) or combinations of wired and wireless technology. Such a data communication network 53 also is configured to provide data communications for at least some of the intelligent lighting devices 37 and possibly other equipment at the premises via a data network 55 outside the premises, shown by way of example as a wide area network (WAN), so as to allow devices 37 or other elements/equipment at the premises 39 to communicate with outside devices such as the server/host computer 57 and the user terminal device 59. The wider area network 55 outside the premises may be an intranet or the Internet, for example.

The premises 39 may be any location or locations serviced for lighting and other purposes by a networked intelligent lighting system 35 of the type described herein. The lighting devices 37 are located to provide lighting service in various areas in or about the premises 39. Most of the examples discussed below focus on building installations for convenience, although the system 35 may be readily adapted to outdoor lighting. Hence, the example of system 35 provides lighting and possibly other services in a number of service areas in or associated with a building, such as various rooms, hallways, corridors or storage areas of a building and an outdoor area associated with a building. Any building at the premises 39, for example, may be an individual or multi-resident dwelling or may provide space for one or more enterprises and/or any combination of residential and enterprise facilities.

The lighting devices 37, as well as any other equipment of the system or that uses the network 53 in the service areas of the premises 39, connect together with and through the network links and any other media forming the communication network 53. For lighting operations, the lighting devices 37 (and other system elements if any) for a given service area are coupled together for network communication with each other through data communication media to form a portion of a physical data communication network. Similar elements in other service areas of the premises are coupled together for network communication with each other through data communication media to form one or more other portions of the physical data communication network at the premises 39. The communication interface 45 in each lighting device 37 in a particular service area will be of a physical type and configured to operate in a manner that is compatible with the physical media and electrical protocol(s) implemented for the particular service area and/or throughout the premises 53. Although the communication interfaces 45 are shown communicating to/from the network cloud via lines, such as wired links or optical fibers; some or all of the interfaces 45 may use wireless communications media such as optical or radio frequency wireless communication. Also, although the examples in FIG. 1 show most of the lighting devices 37 having one communication interface, some or all of the lighting devices 37 may have two or more communications interfaces to enable data communications over different media with the network(s) and/or with other devices in the vicinity.

The various portions of the network in the service areas in turn are coupled together to form a data communication network at the premises, for example to form a premises-wide local area network (LAN) or the like. The overall premises network, generally represented by the cloud 53 in the drawing, encompasses the data links to/from individual devices 37 and any networking interconnections within respective areas of the premises where the devices 37 are installed as well as the LAN or other premises-wide interconnection and associated switching or routing. In many installations, there may be one overall data communication network 39 at the premises. However, for larger premises and/or premises that may actually encompass somewhat separate physical locations, the premises-wide network may actually be built of somewhat separate but interconnected physical networks represented by the dotted line clouds. The LAN or other data network forming the backbone of system network 53 at the premises 39 may be a data network installed for other data communications purposes of the occupants; or the LAN or other implementation of the network 53, may be a data network of a different type installed substantially for lighting system use and for use by only those other devices at the premises that are granted access by the lighting system elements (e.g. by the lighting devices 37).

Hence, there typically will be data communication links within a room or other service area as well as data communication links from the lighting devices 37 in the various rooms or other service areas out to wider network(s) forming the data communication network 53 or the like at the premises 39. Devices 37 within a service area can communicate with each other, with devices 37 in different rooms or other areas, and in at least some cases, with equipment such as 57 and 59 outside the premises 39.

Various network links within a service area, amongst devices in different areas and/or to wider portions of the network 53 may utilize any convenient data communication media, such as power lines wiring, separate wiring such as coax or Ethernet cable, optical fiber, free-space optical, or radio frequency wireless (e.g. Bluetooth or WiFi); and a particular premises 39 may have an overall data network 53 that utilizes combinations of available networking technologies. Some or all of the network communication media may be used by or made available for communications of other gear, equipment or systems within the premises 39. For example, if combinations of WiFi and wired or fiber Ethernet are used for the lighting system communications, the WiFi and Ethernet may also support communications for various computer and/or user terminal devices that the occupant(s) may want to use in the premises. The data communications media may be installed at the time as part of installation of the lighting system 35 at the premises 39 or may already be present from an earlier data communication installation. Depending on the size of the network 53 and the number of devices and other equipment expected to use the network 53 over the service life of the network 53, the network 53 may also include one or more packet switches, routers, gateways, etc.

Of note for purposes of the discussion of the head-wearable user interface device 11 and other types of wearable user interface devices, the system 35 of intelligent lighting devices at the premises 39, particularly the network 53 of that system 35, can support wireless data communications with wearable user interface devices like the head-wearable user interface device 11. For example, the network 53 may include an appropriate wireless access point 54 compatible with the particular transceiver implemented in the head-wearable user interface device 11 and other types of wearable user interface devices that may operate at the premises 39.

An installed lighting device may provide the wireless network access for the head-wearable user interface device. For example, intelligent implementations of the lighting device include communications capabilities. Those capabilities include a network communication interface, for example, to access a broader area network outside the premises. Some lighting device implementations also include a wireless transceiver for use by other devices within the premises. In this latter example, the lighting device itself may provide access via the wireless transceiver for use by the head-wearable user interface device.

Hence, in the example of FIG. 1, in addition to a communication interface 45 for enabling a lighting device to communicate via the network 53, some of the devices 37 may include an additional communication interface, shown as a wireless interface 45W in one or more of the lighting devices 37. The additional interface allows other elements or equipment to access the communication capabilities of the system 35, for example, as an alternative user interface access or for access through the system 35 to the WAN 55. Of note for purposes of the discussion of the head-wearable user interface device 11 and other types of wearable user interface devices, the wireless interface 45W compatible with the particular transceiver implemented in the head-wearable user interface device 11 and other types of wearable user interface devices that may operate at the premises 39 so as to provide additional or alternative access for wearable user interface devices to the data communications capabilities of the system 35.

A host computer or server like 57 can be any suitable network-connected computer, tablet, mobile device or the like programmed to implement desired network-side functionalities. Such a device may have any appropriate data communication interface to link to the WAN 55. Alternatively or in addition, a host computer or server similar to 55 may be operated at the premises 39 and utilize the same networking media that implements data network 53.

The user terminal equipment such as that shown at 59 may be implemented with any suitable processing device that can communicate and offer a suitable user interface. The terminal 59, for example, is shown as a desktop computer with a wired link into the WAN 55. However, other terminal types, such as laptop computers, notebook computers, netbook computers, tablet computers, and smartphones may serve as the user terminal computers. Also, although shown as communicating via a wired link from the WAN 55, such a user terminal device may also or alternatively use wireless or optical media; and such a device may be operated at the premises 39 and utilize the same networking media that implements data network 53.

The network will also include one or more types of wireless access points or base stations generally shown at 61. These access points could provide wireless communication service for wearable user interface devices such as the head-wearable user interface device 11. However, because of the low power operations of such devices, the devices such as the head-wearable user interface device 11 may not be able to communicate directly with wireless access points or base stations generally 61 on the public wide area network 55. However, mobile devices such as smartphones 63 will be able to communicate with one or more types of base stations and wireless access points 61 on the public wide area network 55. Such smartphones 63 and other mobile stations also may be able to communicate via the wireless access point 54 and/or wireless interface 45W in one or more of the lighting devices 37, so as to take advantage of the communications capabilities of the system 35 at the premises 39.

As outlined above, the wireless communications of the system 35 with the head-wearable user interface device 11 may use radio frequency communications, light communications or other technologies. Radio oriented approaches may utilize transceivers in the system 35 similar to radio-based access points in other types of networks, such as may provide wireless connectivity via WiFi, Bluetooth, etc. Light-based approaches (e.g. LiFi, IrDA, etc.) may use modulation of the light source or another source in the lighting device(s) 37 in combination with sensor(s) to detect modulated light from the headgear 11 or other wearable user interface at the premises 39. Hence, wireless light communications could use the illuminating light source 43 of any lighting device 37, another source in the device 37 (e.g. an additional emitter such as a LED designated for communication) or a source in a separate module (e.g. an add-on to the lighting device 37 or as a standalone system element coupled to the network 53). Conversely, wireless light communications could use a corresponding sensor in the same or a different lighting device or in an add-on or separate module.

For various reasons, the communications capabilities provided at the premises 39 may also support communications of the lighting system elements with user terminal devices and/or computers (not shown) within the premises 39. The user terminal devices and/or computers within the premises may use communications interfaces and communications protocols of any type(s) compatible with the on-premises networking technology of the system 35. Such communication with a user terminal, for example, may allow a person in one part of the premises 39 to communicate with a lighting device 37 in another area of the premises 39, to obtain data therefrom and/or to control lighting or other system operations in the other area. If the headgear 11 (or other wearable user interface device) uses lower power data communication technology, the wireless link may be relatively short. In such a case, the wireless link may be with another communication device such as a nearby lighting device 37 with a wireless transceiver or the smartphone 63 configured to act as a hotspot access point transceiver, where the other communication device itself has access to a data network 53 or 55. As in earlier discussions of wireless, the wireless communication for this latest purpose may use any suitable technology, e.g. using any appropriate radio frequency or light-based standards.

The external elements, represented generally by the server/host computer 57 and the user terminal device 59, which may communicate with the intelligent elements of the system 35 at the premises 39 and/or with the wearable user interface devices such as the head-wearable user interface device 11, may be used by various entities and/or for various purposes in relation to operation of the lighting system 35 and/or to provide information or other services to users, e.g. via any of the wearable user interface devices.

For more examples of a system like 35 and discussion of various operations thereof attention may be directed to U.S. application Ser. No. 13/903,428, Filed May 28, 2013 entitled "DISTRIBUTED PROCESSING USING RESOURCES OF INTELLIGENT LIGHTING ELEMENTS OF A LIGHTING SYSTEM;" U.S. application Ser. No. 13/964,564, Filed Aug. 12, 2013 entitled "LIGHTING ELEMENT-CENTRIC NETWORK OF NETWORKS" and U.S. application Ser. No. 13/971,428, Filed Aug. 20, 2013 entitled "INTERACTIVE USER INTERFACE FUNCTIONALITY FOR LIGHTING DEVICES OR SYSTEM;" the disclosures of all of which are entirely incorporated herein by reference.

The drawing also shows a lighting device 65 having an associated barcode 67. Any format or type of barcode may be used. The barcode 67, however, is used here as but one example of an optically machine readable identifier or other marking that may be sensed as one of the input operations using the headgear 11. The machine readable marker also may utilize a combination of optically detectable characteristics or things, e.g. of two or more of a barcode, QR code, some text, some handwriting, color, etc. Optical detection may be in the visible or other portions of the spectrum. If the device has appropriate sensing or input capability, the marker may take other detectable forms, e.g. an MID tag. For purposes of further discussion of the example, we will assume that the marker on the lighting device 65 is a barcode as shown at 67.

The lighting device 65 may be similar to one of the devices 37 of the system 35. For example, before installation as a device 37, the device 67 may be contained in a carton or other package bearing the barcode 67. Alternatively, the barcode may be on or in the lighting device itself. If provided so as to stay on or with the lighting device after installation, a visible version of the barcode 67 typically would be located on the device 67 so as to not remain visible after device installation at the premises 39. As will be discussed more later, the barcode carries data representing one or more parameters of the lighting device 65, such as a product type identifier, a unique device serial number or the like, manufacture date, price, job related data, etc. Some data in the barcode 67 or the like may be for presentation to the user/wearer via the head-wearable user interface device 11 and/or some data in the barcode 67 or the like may allow the headgear 11 to obtain other information (e.g. installation instructions, settings, calibration information, etc.) from a server or the like via network communication. The barcode carries the parameter(s) of the lighting device 67 in such a manner that the parameter(s) can be captured from decoding the bar code via processing of an image of the barcode, in this case captured by the camera of a wearable user interface device (i.e. by the camera 19 of the head-wearable user interface device 11 in the example of FIG. 1). In operation, the camera is triggered to capture an image of the barcode 67, and a processor of the user interface device processes the image to capture the data, in this case including the parameter(s) of the lighting device 67.

It may be helpful now to consider some lighting related operations that may take advantage of the capabilities of the head-wearable user interface device 11. It should be noted that a number of the methodologies discussed by way of example may be implemented using wearable user interface devices such as a smartphone, tablet, laptop, netbook, e-reader, smart watch, smart brooch, or any other device with at least two or more of the following features: a built-in camera, a display and wireless network communications (e.g. WiFi, Bluetooth, Zigbee, LiFi, IrDA, etc.). Particular examples, however, utilize head-wearable user interface device such as the headgear 11.

When appropriately configured for lighting uses, a wearable user interface device like the head-wearable user interface device 11 in the example of FIG. 1 presents a wide range of applications in the context of lighting. It may be helpful to consider a number of methodologies for potential applications with respect to lighting (light fixtures, controls, sensors, etc.). The examples may be applied to the headgear 11 or in the context of other types of wearable user interface devices, such as a smart phone, tablet, laptop, netbook, e-reader, smart watch, smart brooch, etc. The following discussions therefore will refer to the wearable user interface device, with the understanding that an example of such a device is the headgear 11. The head-wearable user interface device 11 and several other types of wearable user interface devices use the camera or other optical sensor for capturing information from or about lighting devices that the wearer observes. Other types of wearable user interface devices may have other data capture mechanisms, such as near-field communication sensing for RFID capture.

In general, a number of our examples relate to installation and service type functions. For example, a wearable user interface device can be to assist an installer do the installation and set-up of a lighting device. If a lighting device does not work, a lighting technician can use a wearable user interface device for troubleshooting. Maintenance personal may also use a wearable user interface device to check status of a particular lighting device. The wearable user interface device may be similarly used in installation and service with regard to other elements of a lighting system, such as standalone sensors and/or controllers (e.g. wall panels/switches/dimmers).

For example, the wearable user interface device may be programmed to provide an installer or set-up technician with device-specific installation instructions. During installation, we will assume that the box and/or lighting device 65 has a unique tag (e.g. barcode 67, QR code, RFID tag, etc.). The wearable user interface device would automatically read that tag as the installer is about to handle the device 65. The tag may contain any or all of a unique identifier, handling/installation instructions, application specific instructions (e.g. location for installation of the specific device). The wearable user interface device could then display exactly where the device needs to be installed. If included in the barcode 67 or other tag, the handling/installation instructions, application specific instructions etc. could be presented by the device on the display or other output element of device. However, if the instructions or the like are not in the barcode or other tag, then the wearable user interface device can communicate with a server such as 57, present the unique identifier to the server and obtain the handling/installation instructions, application specific instructions etc. for display to the user that is wearing the device. Hence, if linked to a communications network, the wearable user interface device could look up and/or verify the information against a central repository (e.g. cloud or server). Device-specific information can then be displayed to the installer while wearing the device. In this way, the installer can know exactly where the device needs to be installed, how it needs to be connected (e.g. electric and communication), what additional parts should be used/installed, etc. Either approach would allow for a lighting system like 35 to be pre-commissioned, or allow for devices with many different configurations (e.g. some with various sensors) to be installed where needed to get the right system functionality.

As another example, the head-wearable user interface device may be operated to read the barcode or the like and communicate the lighting device identifier and location data to a central server. When the identified lighting device is powered, the server and lighting device could work together to download any appropriate specific firmware and/or settings.

In the event that the lighting device is somehow defective (e.g. damaged or non-functional), the installer can submit a claim immediately. To submit a claim, the installer would use an input mechanism (e.g. touch, gestures, voice, etc.) on the wearable user interface device to initiate the claim report. The wearable user interface then detects the tag information. If the wearable user interface device has a camera, the user can take photos/video of any damaged or problem areas and these photos/video will be attached to the claim. When sufficient information has been gathered, the claim will be submitted to a central repository. This repository may be with the lighting system provider or with the installation company so they can aggregate multiple issues into a small number of larger claims.

As another application/method example, the wearable user interface device can be adapted to display commissioning and/or troubleshooting information after initial installation and commissioning. The fixtures 37 somehow identify themselves to the wearable user interface device. This could be done through some type of light communication channel, for example, by modulating the output of each light source 43 with a unique identifier (e.g. visible light communication, ByteLight, LiFi, etc.). Virtual lines can then be overlaid on the scene connecting devices in the same group(s) on an image presented on the display. Alternately or additionally, lighting devices 37 in a group can be virtually decorated with some common indicator (e.g. border, icon, highlight, arrow, etc.) to indicate that the lighting devices 37 are in a group together. For example, the user interface could be configured to draw a border of one color around the perimeter of each device in a given group, e.g. when the display shows information about (e.g. a map of) a group of the lighting devices 37 or when the user is viewing a group of actual lighting devices 37 through the augmented reality display. Different colored borders could indicate other group memberships. This type of projection of a ring or the like on the display highlights the lighting device in question, when viewing the lighting device and/or information related to the device, effectively providing a visual marking of the device on the display for the wearer.

Similarly, the lighting devices could be loaded with the intended application lighting design metrics (e.g. design illuminance levels at each point on a grid). This information can be communicated to the head-wearable user interface device 11 (or the head-wearable user interface device 11 could download it from a server) and the design grid could be displayed as an overlay on the actual space. The wearer could then more easily use some type of meter, configured to measure the specified quantity (e.g. illuminance), at each point and verify that the installation meets the specification.

We will next consider another commissioning-related application or use case example. After the lighting devices are installed, the user could select a commissioning program on the headgear. This would start up the camera and any sensors needed to detect the identifier tags on the lighting devices and as much positional information as possible about the headgear. As the user looks around the space, the camera (and/or other types of sensors) would map the space (e.g. room) and uniquely identify each lighting device in the space. The algorithm would deduce relative positions between key features (e.g. between the various fixtures, windows, wall corners, vegetation, etc.). In cases where there are plans and blueprints, the software can then match each lighting device with its most probable match on the blueprints and assign configuration settings to each lighting device as appropriate.

If the lighting system devices are configured as luminaires, these devices could be loaded with their photometric performance data (e.g. photometric distribution, color point, correlated color temperature (CCT), lumen output, etc.). If the lighting system has sufficient capability, it could then predict the expected light levels in the actual space, otherwise this calculation could be done in the wearable user interface device or on a server contacted by the wearable user interface device. Once the expected photometric performance in the application space is known to the head-wearable user interface device 11, this information can be displayed to the user (perhaps as a virtual overlay), and the user could use it to audit the space. If the user interface device is connected to, or is being used as, the photometric measurement device, the actual readings can be automatically transmitted back to the lighting devices and their calibrations can be adjusted as appropriate.

For example, a lighting application on the device 11 might process a camera input and/or an optical sensor input to measure light parameters from a fixture (photometric measurements). The parameters would then be processed in the device or communicated and processed and responsive information sent back for display, for use in calibration or testing of performance and/or for use in selecting fixtures that provide similar characteristics. As another example, such a capability might facilitate an audit of performance of devices 37 at a premises 9, as against lighting design, e.g. to confirm that the installed fixture base performs to the design specification.

Fixtures can communicate operational data to the wearable user interface device which can then overlay that information on the user's view. For example, each fixture could communicate "health" data as to its operational status. Examples of such "health" related data includes performance (current, historical, and/or spec), operation metrics (e.g. history, expected remaining life), installed hardware/firmware/software, hardware/firmware/software versions & installation dates, patches installed, what other devices/peripherals are installed, status of the peripherals, etc. The head-wearable user interface device 11 could overlay that information on that fixture as the user looks at it visually through the transparency of the heads-up augmented reality display. A head-wearable user interface device 11 may display such information in the form of a dashboard (e.g. traffic lights, check marks, etc.) so the user can quickly scan for faults. This may be taken to a minimalist level of only indicating (e.g. red×vs. green checkmark) that there is a fault or that a particular device is operating within expected parameters.

The user could look at a lighting device 37, somehow indicate that they would like to "select" that device 37 (possibly through gestures or other means), and the head-wearable user interface device 11 would overlay some indicator to say that the device 37 was selected (e.g. display a border around the selected device in the heads up display). Multiple devices 37 could be selected in this manner. When complete, the user could then manipulate the selected fixtures 37 as a group (e.g. lighting control, upload commissioning information, create/modify a logical group of devices, etc.). When using gestures, the user may select multiple devices by virtually drawing a "loop" around all the devices to be selected. Alternately, the user may virtually "draw" a continuous line that connects the devices to be selected (e.g. "connect the dots"-style).

In cases where each lighting device has a unique identifier that can be detected by the wearable user interface device, and where the position of each lighting device is known, then the user interface device can accurately calculate its position and orientation. The identifiers could be communicated via visible light communication (e.g. lighting device modulates output and wearable user interface device detects using the camera (e.g. ByteLight)). With such a system, the lighting devices 37 of the system 35 form a fixed constellation of emitters at known positions and orientations. This position and orientation information can be used to enable determination of the location of a wearable user interface device (by the wearable user interface device itself or by another processing component processing identifiers captured by the wearable user interface device). With such location information, for example, the wearable user interface device could direct the user to the exact shelf that the user is looking for, for example, to find a product in a store or warehouse setting. With a ByteLight-type system, the lighting system 37 could send coupons or other promotional information to the wearable user interface device (or cause the wearable user interface device to go get the information by communication with a server such as 57) when a user gets close to the item or place in question.

In outdoor applications, the high accuracy positioning information from above can be combined with high resolution maps in the wearable user interface device or in the lighting system (e.g. in one or more of the lighting devices). This data can be presented to users (e.g. disabled users), through the wearable user interface device so the user knows very precisely where they are. Other sensor/environment data (e.g. automobile occupancy sensing, traffic control signals, time of day, weather, etc.) can be collected by the lighting system, and then communicated to the wearable user interface devices of disabled "pedestrians" (e.g. blind) so they can navigate the space more safely & easily (e.g. cross the street when safe and/or legal). This pedestrian data can also be communicated, through the lighting system, back to the traffic control systems so traffic patterns can be modified as appropriate.

Another use case example involves the wearable user interface device obtaining sales information as the user walks by a lighting device 37. In this example, the wearable user interface device gets 6D positional data (position+angle=6 degrees of freedom) through its camera by its view of a constellation of lighting devices 37. Based on location and orientation of the wearable user interface device, the lighting system would know where the user is pointed and therefore what they are likely looking at. The lighting system can then transmit related information (e.g. about products in the vicinity) by communicating location to a server 57 and receiving information for presentation to the wearer of the user interface device.

As another example, exit signs and possibly other devices 37 of the lighting system 35 can collect, analyze and communicate building status information (e.g. from fire/smoke detectors, power faults, ambient temperature readings (e.g. thermostats, ambient temp sensors in lighting devices), etc.), to occupants through the wearable user interface devices. For example, when an exit or exit path is blocked, the lighting system 35 may detect this through elevated smoke levels and temperatures in a certain section of the building. It can then send that information to the wearable user interface devices of nearby occupants so they can find alternate egress routes. If the lighting system 35 has enough information to determine a "best" egress route, that route can be communicated to the wearable user interface device. This new path can be presented by the device to the wearer as a list of instructions, a map or as a live overlay on the space. Although the example presented is where the lighting system can provide directions in emergencies, it should be apparent that this system could be used to, in non-emergency situations, guide guests in buildings to their desired destinations in similar ways.

As another example, a lighting system 35 could track wearable user interface devices, to track where people are within the premises 29. Such a system configuration could then offer a variety of location related information to the device users. For example, the system could help people within the premises 29 find each other, e.g. in a crowd.

As mentioned earlier, a wearable user interface device may have an additional camera primarily intended for communication with the lighting system. For example, if, in the normal expected use scenarios of the wearable interface, the main camera is not pointed towards the lighting system 35, it may be beneficial to add a camera or other sensor system that is oriented and configured to have a good view of installed components of the lighting system.

It may be helpful at this point to consider an example of the electronics of a wearable user interface device, in somewhat more detail. For that purposes, FIG. 2 includes a high-level functional block diagram of a wearable user interface device, in this example, of the head-wearable user interface device 11, configured to provide a user interface for lighting related purposes.

As discussed earlier, the example of the head-wearable user interface device 11 includes a display supported by the framework so as to be viewable by at least one eye of the user when wearing the headgear 11. The display is shown generically at 71 in FIG. 2, since it may be implemented using a variety of technologies capable to providing an augmented reality display to the user wearing the headgear 11. In the example of FIG. 1, one or both of the lenses 14L and 14R also form(s) the display corresponding to 71 in the block diagram circuit example of FIG. 2.

The head-wearable user interface device 11 includes a display driver 73 for providing signals to operate the display 71 so as to present information to the user while wearing the headgear 11. The particular type of driver corresponds to the type of technology used to implement the display 71. The driver 73 thus controls information output via the display 71, in response to instructions and data from other elements of the device 11, e.g. from the processor shown at 75.

Figure 2:
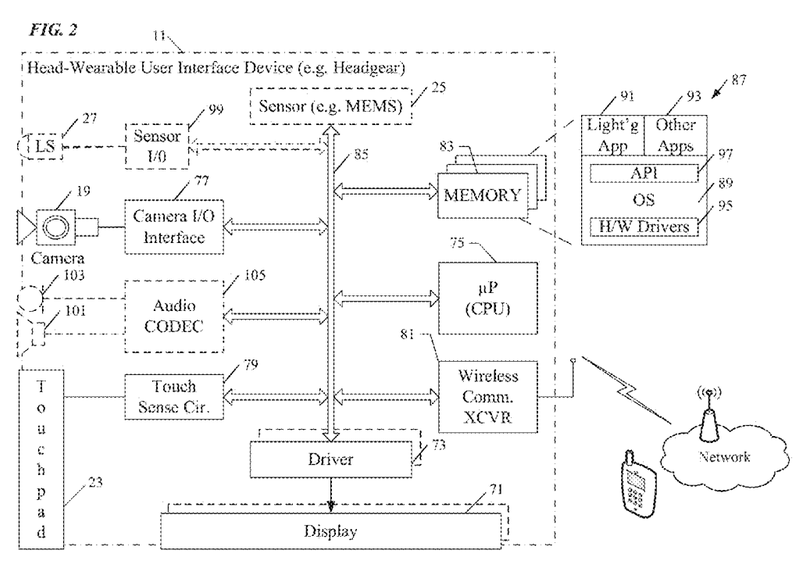
FIG. 2 includes a high-level functional block diagram of an example of a wearable user interface device, configured to provide a user interface for lighting related purposes.

The headgear 11 may include one display, e.g. one of the lenses 14L, 14R or a continuous display element extending across the fields of view of both eyes of the user/wearer. 71 represents and single display element in FIG. 2 and is operated via a single display driver circuit 73. Alternatively, the headgear 11 may include two displays, for example, the two lenses 14L and 14R. In this later case, the headgear 11 may utilize one combined driver circuit 73 or two individual display driver circuits. Hence, second display elements and driver circuits are shown in FIG. 2 in dotted line form.

Although other optical input devices may be provided instead of or in addition, the headgear 11 or other wearable user interface devices in the example includes a camera 19 supported by the framework. Some instances of the devices may include multiple cameras, like in a smartphone or tablet computer; but using current technologies, the wearable headgear 11 will typically include one camera 19 in view of constraints regarding size, weight and power consumption.

The electronics of the headgear 11 in the example also include a camera input output (I/O) interface circuit 77. The camera I/O circuit 77 provides control of the camera operations in response to control instructions from the processor 75 and processes signals from the camera 19 for appropriate communications within the device 11 to other elements. The signal processing of the I/O circuit 77 could provide an analog or digital interface to the camera 19, depending on the particular type of camera, although the internal communications of still images or video captured via the camera will likely use a standardized format. Depending on the technology and/or manufacturer, the camera and I/O circuit may be an integral unit.

The head-wearable user interface device 11 in our examples includes a user input supported by the framework. The user input in the example is a touchpad 23. A touchpad 23, for example, may be a capacitive or other type of touch sensor similar to touchpads commonly used today on user terminal type computer devices. Instead of or in addition to the touchpad 23, the user input may include one or some small number of finger-operable buttons or switches (e.g. mounted along or on one or both of the wings of the eyeglass frame).

For the touchpad 23 type of user input, the head-wearable user interface device 11 also includes a touch/position sense circuit 79. If signals are required to operate the touch pad, the circuit 79 supplies these signals. The circuit 79 then senses signals from elements of the touchpad 23 and detects occurrence and position of each touch of the pad 23. The sense circuit 79 provides touch position information to the processor 75, which can correlate that information to state(s) of the device 11 and/or to any relevant information currently displayed via the display 71, to determine the nature of user input via the touchpad 23. Depending on the touchpad technology and/or manufacturer, the touchpad 23 and touch sensing circuit 79 may be an integral unit.

Although it may be outside the housing or framework of the device 11, the headgear has a wireless transceiver (XCVR) 81 that supports data communications for the headgear 11. The transceiver 81 provides two-way wireless communication of information, such as user input data for content selection, still or video image data and requested content for display, in accordance with the applicable wireless technology standard and higher level communication protocols. The transceiver 81 also sends and receives a variety of signaling in support of the various communications for the wearable user interface device 11.

The transceiver 81 may be a cellular or Wi-Fi type radio communication device, for wireless data communications. For low-power operations and/or due to size constraints, the transceiver may be a Bluetooth or other low power wireless data communication transceiver. If the headgear 11 uses Wi-Fi or cellular data communication, the wireless link may go to an access point or base station of the applicable data network, as outlined above relative to FIG. 1. It is also envisioned that the device 11 may use other types of wireless communication technologies, such as Bluetooth, Zigbee, LiFi, IrDA, etc. If the headgear 11 uses lower power data communication technology, the wireless link may be relatively short. In such a case, the wireless link may be with another communication device, such as a smartphone, configured to act as a hotspot access point transceiver, where the other communication device itself has access to a data network.

As noted, the headgear 11 includes a processor 75 that controls device operations as well as one or more memories 83. The one or more memory devices 83 of the head-wearable user interface device 11 store programming for execution by the processor and data that is available to be processed or has been processed by the processor. For such purposes, the headgear 11 may use flash memory and/or other miniature memory devices.

Any of the various wearable user interface devices, including headgear 11, may be implemented using a PC like approach based on any known or available microprocessor architecture, such as a Reduced Instruction Set Computing (RISC) using an ARM architecture, as commonly used today in mobile devices and other portable electronic devices, or a microprocessor architecture more commonly used in computers such as an instruction set architecture (ISA), like those used in Intel microprocessors and the like. The example of FIG. 2 shows the processor in the form of a microprocessor (µP) implementing a central processing unit (CPU) function. The processor 75 is coupled to the one or more memories 83, the display 71, the camera 19, the transceiver 81 and the touchpad input device 23. Although other arrangements may be used, the example shows communications amongst such device elements via a bus network 83. The microprocessor based approaches are discussed by way of examples, with respect to FIG. 2; however, other processor implementations may be used, such as based on a Peripheral Interface Controller (PIC) or other microcontroller architecture.

The memories 83, for example, may include read only memory (ROM), non-volatile random access memory (NV-RAM), and flash memory. The RAM in such an example serves as a working memory for loading instructions for execution and for holding data during data processing. The processor 75 is configured to control operations of the headgear 11 and has access to the programming in the memory devices 83. The memories 83 store programming 87 such as a boot routine (not shown), an operating system 89, application programs, 91, 93 as well as configuration data or settings. Of course, other storage devices or configurations may be added to or substituted for those discussed in this example.

The operating system 89 includes or works through hardware (H/D) device driver software 95 to enable the processor 75 to communicate with and control the other elements of the device 11. The operating system also implements one or more application program interfaces (APIs) 97. The API allows application layer programming to operate on the device through the operating system 89 to utilize various features, functions and physical components of the device 11. The API provides a published interface standard to allow applications written in conformance with that standard to execute on the processor 75 and operate via the operating system 89.

For example, execution of the operating system 89 provides a graphical user interface (GUI) for the user when wearing the headgear, via the display 71 and the touchpad 23 (or other user input). In this way, various combinations of the touchpad 23 (and/or other button or key inputs if provided), display (and possibly any other input/output devices if provided) may be used as the physical input output elements of the GUI. Applications running on top of the operating system 89 can in turn use and adapt that GUI to respective purposes of the applications.

Considering Google Glass by way of an example of suitable headgear 11, a Google Glass device runs a version of Android as the operating system 89. The lighting application 91 and any other applications 93 would be written to run through Android.

The headgear 11 may have and run any appropriate number of applications, including one or more lighting related applications. To illustrate the point, the drawing shows the programming 87 including a lighting related application 91 as well as some number of other applications 93 for other purposes or services of the wearable user interface device 11. In addition to normal operations of the head-wearable user interface device, the programming for the processor configures the headgear to perform lighting related operations.

The lighting application 91, for example, configures the head-wearable user interface device to provide one or more user interface functions for the user wearing the headgear, with respect to a lighting device or system observable to the user while wearing the headgear. For example, execution of the lighting application 91 adapts the GUI for lighting related operations, including for the presentation of lighting information via the display 71.

In support of several examples of methods of device operation outlined above, the lighting application 91 configures the head-wearable user interface device 11 for specific functions relating to a lighting device or system observable by the user while wearing the headgear, some of which utilize input and/or output via the GUI of the headgear 11. The lighting related functions, for example, may include, processing of a still or moving (video) image obtained via the camera 19 to capture a parameter of a lighting device, in response to a selection via the touchpad 23 as the user input device. Then, based on the captured parameter, the headgear 11 uses the transceiver 81 to wirelessly communicate to obtain lighting installation or operation-related information with respect to the lighting device via a communication network and present the obtained information to the user while wearing headgear, via the heads-up display 71.

As another example, the user wearing the headgear 11 may activate the touchpad 23 several times to select among available applications for the processor to run, so as to pick the lighting related application. In response to this latter type of selection, the headgear 11 wakes the lighting application and provides an initial display with respect to the lighting application on the display 71. Either in response to application launch or in response to a later selection by the user, the lighting application causes the camera 19 to operate and capture a desired image or video.

In the example of FIG. 2, the headgear includes a processor and display for processing camera images and/or received or image-captured data on a display. Displayable information, however, may be received and presented in other ways. For example, a system in the vicinity, such as an intelligent lighting system 35, may supply information that a human user may be able to observe and discern with some degree of optical processing by the wearable device. For example, a lighting fixture might modulate its light output in a complex way that a normal viewer (without the interface device) would not detect, at least not in any meaningful way. A user wearing appropriately configured headgear, however, would be able to see the information. The information presented in such a way might be information generated by the headgear and sent to the fixture and/or information from the system or a network that is transmitted for the user via the fixture. To receive the transmitted information, in such an example, the headgear would have a processor, a communications network interface and a relatively passive lens configured to make the information discernible, while the fixture itself is the display; but the displayed information is only visible to a person using the special lenses.

As noted in the discussion of FIG. 1, the head-wearable user interface device 11 may include one or more additional sensors, represented by way of example by the sensors 25 and 27.

The sensor 25 represents one or more devices that may be included in the headgear to sense orientation and/or movement of the headgear while worn by the user. By way of an example, the sensor 25 may be or include micro-scale components such as an accelerometer, a gyroscope and/or a field strength and direction sensing magnetometer, for example, implemented using Micro-Electromechanical Systems (MEMS) similar to devices used in smartphones or the like to detect direction (e.g. compass heading), elevation angle, motion and/or acceleration.

If provided, the additional light sensor 27 may be a quadrant hemispherical detector (QHD), a light intensity sensor, and/or a color characteristic sensor, etc. One or more such additional light responsive sensors can provide information to the processor about the intensity of light and/or color characteristic of light, for example, to adjust operations of the camera or to assist in processing to recognize a barcode or other object captured in an image via the camera. A QHD, for example, provides light intensity sensing with respect to four quadrants and supports signal processing to determine the direction of light input. Several of these types of additional light sensors 27 also support detection of modulation of the light input. To support communication of information from the sensor 27 and the other system device elements, e.g. the processor 75, the memories 83 and/or transceiver 81, the headgear may include a sensor input/output circuit 99. Such a circuit 99, for example, would process signals from the particular sensor(s) 27 for communication in the appropriate digital format over the bus network 85. Although shown separately, depending on the technology and/or manufacturer, a particular optical sensor 27 and its associated the sensor I/O circuit 99 may be an integral unit configured to have a standard interface connection to the bus 85 or other media used in the wearable user interface device 11.

In addition to the elements discussed above, the head-wearable user interface device 11 may include a number of still further elements. For example, if the device 11 is intended to support audio, the device may include a speaker 101 and/or a microphone 103. A speaker 101 provides an audio signal output. A speaker 101, for example, may be incorporated into an earpiece at the distal end of one of the wings 17R, 17L or take the form of an earphone connected thereto. Instead of a traditional speaker, the audio output could be a bone conduction device; and other audio input technologies may be substituted for the microphone in the example. If included, the includes a microphone 103 provides an audio signal input. If provided, the speaker 101 and microphone 103 connect to voice coding and decoding circuitry (vocoder) 105. The speaker and/or microphone provide additional user output/input elements for the user interface functions. For example, the device may be configured to sense spoken commands via the microphone 103 and to provide an audio output of lighting-related information via the speaker 101.

A sensor (not shown) may also be included to allow tracking of the user's eye movement while wearing the headgear 11, e.g. to identify a portion of displayed information or an object viewed through the lenses (as being captured in any image input via the camera).

Figure 3:
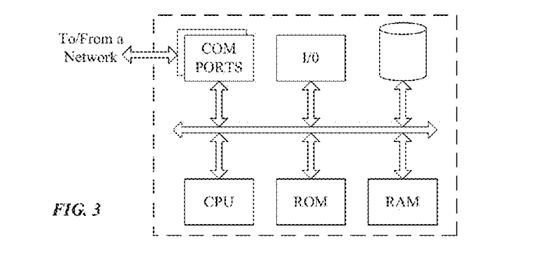
FIG. 3 is a simplified functional block diagram of a computer that may be configured as a host or server, for example, to function as the server in a system like that of the example of FIG. 1.
Figure 4:
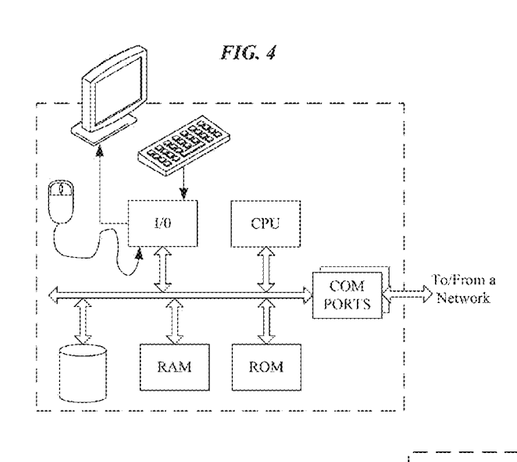
FIG. 4 is a simplified functional block diagram of a personal computer or other user terminal device, which may be used as the remote access terminal, in a system of intelligent lighting devices like that of FIG. 1.
Figure 5:
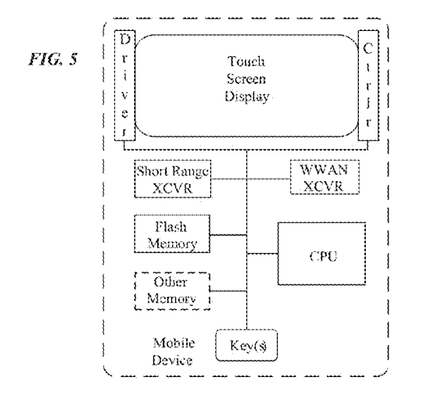
FIG. 5 is a simplified functional block diagram of a mobile device, as an alternate example of a user terminal device, for possible communication in or with a system of intelligent lighting devices like that of FIG. 1.

As shown by the above discussion, at least some functions of devices associated or in communication with the networked system of intelligent lighting device of FIG. 1, with which head-wearable user interface device or other types of wearable user interface device may communicate, may be implemented with general purpose computers or other general purpose user terminal devices, although special purpose devices may be used. FIGS. 3-5 provide functional block diagram illustrations of exemplary general purpose hardware platforms.

FIG. 3 illustrates a network or host computer platform, as may typically be used to implement a host or server, such as the computer 57. FIG. 4 depicts a computer with user interface elements, as may be used to implement a personal computer or other type of work station or terminal device, such as terminal device 59, although the computer of FIG. 4 may also act as a server if appropriately programmed. The block diagram of a hardware platform of FIG. 5 represents an example of a mobile device, such as a tablet computer, smartphone (e.g. 63 in FIG. 1) or the like with a network interface to a wireless link, which may alternatively serve as a wearable user interface device similar to device 11 but in other form factors. It is believed that those skilled in the art are familiar with the structure, programming and general operation of such computer equipment and as a result the drawings should be self-explanatory.

A server (see e.g. FIG. 3), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. Also, a computer configured as a server with respect to one layer or function may be configured as a client of a server in a different layer and/or for a different function.

A computer type user terminal device (see FIG. 4), such as a desktop or laptop type personal computer (PC), similarly includes a data communication interface CPU, main memory (such as a random access memory (RAM)) and one or more disc drives or other mass storage devices for storing user data and the various executable programs. A mobile device (see FIG. 5) type user terminal may include similar elements, but will typically use smaller components that also require less power, to facilitate implementation in a portable form factor. The example of FIG. 5 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer terminal, or more likely the mobile device, may provide wireless communication capability to/from a wearable user interface device such as headgear 11 and then use its own network connection to provide network access for the wearable user interface device. The computer hardware platform of FIG. 4 and the terminal computer platform of FIG. 5 are shown by way of example as using a RAM type main memory and a hard disk drive for mass storage of data and programming, whereas the mobile device of FIG. 7 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 4). The mobile device example in FIG. 5 touchscreen type display, where the display is controlled by a display driver, and user touching of the screen is detected by a touch sense circuit (Cir.). The hardware elements, operating systems and programming languages of such computer and/or mobile user terminal devices also are conventional in nature, and it is presumed that those skilled in the art are adequately familiar therewith.

Although FIGS. 3-5 in their present form show computers and user terminal devices, generally similar configurations also may be used within other elements of the lighting system and/or as wearable user interface devices. For example, one implementation of the brain, communication and interface elements of a lighting device may utilize an architecture similar to that of one of the computers or mobile terminals. As a more specific example, the personal computer type hardware in FIG. 4 (except for the keyboard, mouse and display) could serve as the brain and communication elements of a lighting device, where the input/output interface I/O would interface to an appropriate light driver and to any sensor(s) or other enhancement input or output device(s) included within the lighting device. As another example, some types of wearable user interface devices might utilize an arrangement similar to the mobile device of FIG. 5, albeit possibly with only one wireless transceiver compatible with the relevant networking technology and smaller/lower capacity electronics and display (e.g. to reduce costs, size and/or power consumption).

As also outlined above, aspects of the lighting related operations of the head-wearable user interface device and any other types of wearable user interface device that might offer a similar interactive user interface vis-à-vis lighting may be embodied in programming of the appropriate system headgear or other type of interface device, e.g. particularly for the processors of head-wearable user interface device devices 11 or the like. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the lighting application software from one computer or processor into another, for example, from a management server or host computer of a lighting system service provider (e.g. implemented like the server computer shown at 27) into any of the wearable user interface devices such as headgear 11. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A head-wearable user interface device, comprising:
    a framework configured to enable a user to wear the user interface device;
    a display supported by the framework so as to be viewable by at least one eye of the user when wearing the user interface device;
    a camera supported by the framework;
    a wireless communication transceiver;
    a user input supported by the framework;
    a processor, supported by the framework, coupled to the display, the camera, the transceiver and the user input, the processor being configured to control operations of the user interface device;
    a memory accessible to the processor and supported by the framework; and
    a programming in the memory, wherein execution of the programming by the processor configures the user interface device to perform functions, the programming including:
        an operating system for the processor, wherein execution of the operating system provides a graphical user interface (GUI) for the user when wearing the user interface device, via the display and user input; and a lighting application, wherein execution of the lighting application causes the user interface device to:

in response to a selection via the user input, process an image obtained via the camera to capture a parameter of a lighting device configured for illumination of space by measuring light parameters in the space illuminated by the lighting device;

based on the captured parameter of the lighting device configured for illumination of the space, wirelessly communicate to obtain lighting installation or operation-related information with respect to the lighting device configured for illumination of the space via a communication network by retrieving from data storage of the head-wearable user device or downloading from a server, lighting design metrics that include design photometric data for the space illuminated by the lighting device;

compare the captured parameter of the lighting device against the obtained design photometric data;

determine whether installation of the lighting device configured for illumination of the space performs according to the obtained lighting design metrics based on the comparison; and display in the GUI the determination of whether the installation of the lighting device configured for illumination of the space meets the lighting design metrics.

2. The user interface device of claim 1, further comprising:

a light sensor supported by the framework and coupled as an input to the processor; and a sensor configured to sense orientation of the user interface device.

3. The user interface device of claim 1, wherein:

the display is configured to provide an augmented reality display.

4. The user interface device of claim 1, wherein:

the user input comprises a touchpad supported by the framework.

5. The user interface device of claim 1, wherein the lighting application configures the user interface device to support one or more lighting procedures from the group consisting of:

lighting device installation;
lighting device set-up or configuration;
lighting device calibration;
lighting device performance measurement or testing;
determination of location of a specific lighting device; and
configuration of lighting devices of a lighting system.

6. The user interface device of claim 1, further comprising an optical input sensor.

7. The user interface device of claim 1, further comprising a sensor configured to detect motion or orientation of the device.

8. The user interface device of claim 1, further comprising at least one of: an audio input configured to detect verbal user input or an audio output configured to provide an audio output to the user while wearing the interface device.

9. The user interface device of claim 1, wherein the framework comprises an eyewear frame having a structure to configure the user interface device to be worn as goggles or eyeglasses.

10. The user interface device of claim 1, wherein the wireless communication transceiver is configured to send or receive data via radio frequency wireless communication.

11. The user interface device of claim 1, wherein the wireless communication transceiver is configured to perform as least one of sending or receiving data as a communication via light.

12. The user interface device of claim 1, wherein the measured light parameters include photometric measurements selected from the group consisting of: illuminance, photometric distribution, color point, correlated color temperature (CCT), lumen output, and expected light levels in the space.

13. The user interface device of claim 12, wherein execution of the lighting application further configures the user interface device to:

transmit, via the communication network, the photometric measurements back to the lighting device configured for illumination of the space to adjust calibration of the lighting device.

14. An article of manufacture, comprising:

a non-transitory machine readable medium; and
programming embodied in the medium,
wherein execution of the programming by a processor of a head-wearable user interface device having a visual or audio output device, an optical input and a wireless communication transceiver configures the head-wearable user interface device to perform functions, including functions to:

in response to a user input selection, process a signal from the optical input to capture a parameter of a lighting device configured for illumination of space by measuring light parameters in the space illuminated by the lighting device;

based on the captured parameter configured for illumination of the space, wirelessly communicate to obtain lighting installation or operation-related information with respect to the lighting device configured for illumination of the space via a communication network by retrieving from data storage of the head-wearable user device or downloading from a server, lighting design metrics that include design photometric data for the space illuminated by the lighting device;

compare the captured parameter of the lighting device against the obtained design photometric data;

determine whether installation of the lighting device configured for illumination of the space performs according to the obtained lighting design metrics based on the comparison; and present the determination of whether the installation of the lighting device configured for illumination of the space meets the lighting design metrics to the user while wearing the user interface device, via the output device.

15. The article of manufacture of claim 14, wherein the programming includes:

an operating system for the processor, wherein execution of the operating system provides a graphical user interface (GUI), at least in part via a display as the output device; and a lighting application, wherein:
  execution of the lighting application causes the user interface device to implement a function to process a signal from the optical input to obtain the parameter of the lighting device configured for illumination of the space and communicate to obtain the lighting information, and
  execution of the lighting application adapts the GUI for lighting related operations, including for the presentation of the obtained information via the display.

16. The article of manufacture of claim 14, wherein the lighting application configures the user interface device to support one or more lighting procedures from the group consisting of:
  lighting device installation;
  lighting device set-up or configuration;
  lighting device calibration;
  lighting device performance measurement or testing;
  determination of location of a specific lighting device; and
  configuration of lighting devices of a lighting system.

17. A head-wearable user interface device comprising:
  a framework configured to enable a user to wear the user interface device;
  a display supported by the framework so as to be viewable by at least one eye of the user when wearing the user interface device;
  a camera supported by the framework;
  a wireless communication transceiver;
  a user input supported by the framework;
  a processor, supported by the framework, coupled to the display, the camera, the transceiver and the user input, the processor being configured to control operations of the user interface device;
  a memory accessible to the processor and supported by the framework; and
  a programming in the memory, wherein execution of the programming by the processor configures the user interface device to perform functions, the programming including:
    an operating system for the processor, wherein execution of the operating system provides a graphical user interface (GUI) for the user when wearing the user interface device, via the display and user input; and
    a lighting application, wherein execution of the lighting application causes the user interface device to:
      in response to a selection via the user input, process an image obtained via the camera to capture a parameter of a lighting device configured for illumination of space by, in response to installation of the lighting device configured for illumination of the space, mapping the space via the camera such that the mapped space includes a relative position between the lighting device and one or more key features of the space;
      load photometric performance data for the lighting device configured for illumination of the space by, based on the captured parameter of the lighting device configured for illumination of the space, wirelessly communicating to obtain lighting installation or operation-related information with respect to the lighting device configured for illumination of the space via a communication network;
      calculate an expected light level in the space based on the mapped space and the loaded photometric performance data; and
      adjust calibration of the lighting device based on the calculated expected light level; and
      present the expected light level in the space or the adjusted calibration of the lighting device to the user while wearing user interface device, via the display.

18. The user interface device of claim 17, further comprising:
  a light sensor supported by the framework and coupled as an input to the processor; and
  a sensor configured to sense orientation of the user interface device.

19. The user interface device of claim 17, wherein:
  the display is configured to provide an augmented reality display.

20. The user interface device of claim 17, wherein the lighting application configures the user interface device to support one or more lighting procedures from the group consisting of:
  lighting device installation;
  lighting device set-up or configuration;
  lighting device calibration;
  lighting device performance measurement or testing;
  determination of location of a specific lighting device; and
  configuration of lighting devices of a lighting system.

* * * * *